US008734922B2

(12) United States Patent
Bellini et al.

(10) Patent No.: US 8,734,922 B2
(45) Date of Patent: May 27, 2014

(54) MULTILAYER FILM FOR PACKAGING FLUID PRODUCTS

(75) Inventors: Laura Bellini, Milan (IT); Matteo Colaone, Como (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 13/704,887

(22) PCT Filed: Jun. 17, 2011

(86) PCT No.: PCT/EP2011/060088
§ 371 (c)(1),
(2), (4) Date: Dec. 17, 2012

(87) PCT Pub. No.: WO2011/157813
PCT Pub. Date: Dec. 22, 2011

(65) Prior Publication Data
US 2013/0092590 A1     Apr. 18, 2013

(30) Foreign Application Priority Data

Jun. 18, 2010   (EP) .................................... 10166583

(51) Int. Cl.
     *B29D 22/00*      (2006.01)
     *B29D 23/00*      (2006.01)
     *B32B 1/08*      (2006.01)
     *B32B 27/32*      (2006.01)

(52) U.S. Cl.
USPC .................. 428/35.2; 428/474.4; 428/475.5; 428/500; 428/515; 383/116; 206/524.2; 264/171.27

(58) Field of Classification Search
USPC .................. 428/35.2, 474.4, 475.5, 500, 515; 383/116; 206/524.2; 264/171.27
See application file for complete search history.

(56) References Cited

U.S. PATENT DOCUMENTS

| 4,753,700 A | 6/1988 | Fant |
| 4,755,419 A | 7/1988 | Shah |
| 5,972,443 A | 10/1999 | Breck et al. |
| 6,780,373 B1 | 8/2004 | Musco |
| 6,858,313 B2 | 2/2005 | Musco et al. |
| 6,984,442 B2 | 1/2006 | Brebion et al. |
| 2003/0017352 A1* | 1/2003 | Dayrit et al. ............... 428/475.8 |

OTHER PUBLICATIONS

Francesco Pisciotti et al, Effects of Injection-Molding Conditions on the Gloss and Color of Pigmented Polypropylene, Polymer Engineering and Science, Dec. 1, 2005, pp. 1557-1567, vol. 45, No. 12, Brookfield Center, US.
ASTM D2457-08, Standard Test Method for Specular Gloss of Plastic Films and Solid Plastics, ASTM D2457-08, Jan. 1, 2008, pp. 576-581, vol. D2457-08.
Standard Test Method for Haze and Luminous Transmittance of Transparent Plastics, ASTM Designation, ASTM International, Inc., Jul. 1, 2000, pp. 1-06, vol. D1003.
Practice for Design and Use of Safety Alert System for Hazardous Work in the Coatings and Lining Industry, ASTM D4257-87, Jan. 1, 1987, pp. 740-742.
Paul Tas et al., Melt, Strength, Maximum Output, and Physical Properties of Surpass sLLDPE-LDPE Blends in Blown Film, Journal of Plastic Film and Sheeting, Oct. 1, 2005, pp. 265-279, vol. 21, No. 4, Lancaster, PA, US.
P. Tas, S. Marshall, T. Swabey, Processability and Film Performance of Single Site sLLDPE/LDPE Blends, url: http://www.tappi.org/cpontent/enewsletters/eplace/2004/09-3Marshall.pdf, Apr. 13, 2005.
Mangaraj, S., Goswami, T.K., Mahajan, P.V., Applications of Plastic Films for Modified Atmosphere Packaging of Fruits and Vegetables: A Review, Food Engineering Reviews, Jul. 15, 2009, pp. 133-158, No. 1.

* cited by examiner

*Primary Examiner* — Michael C Miggins
(74) *Attorney, Agent, or Firm* — Mark B. Quatt

(57) ABSTRACT

Co-extruded multilayer packaging films suitable for packaging fluid products, showing a very good balance of mechanical, chemical and, optionally, barrier properties, good sealability, heat resistance and unexpectedly improved optical properties, a process for their manufacturing, pouches and packages obtained from them, are disclosed. These films comprise a core layer (D) comprising a polyamide; two tie layers (C), directly adhered to the opposite surfaces of the core layer; at least one intermediate layer (B), directly adhered to the opposite surface of a tie layer (C), comprising high density polyethylene; and two outer layers (A) comprising an ethylene/alpha olefin copolymer.

13 Claims, No Drawings

MULTILAYER FILM FOR PACKAGING FLUID PRODUCTS

TECHNICAL FIELD

The present invention relates generally to multilayer packaging films, and more specifically to co-extruded multilayer packaging films suitable for packaging fluid products, to a process for manufacturing them and to the packages obtained therefrom.

BACKGROUND ART

Pouches made from films or laminates have found use in a variety of applications. For example, they are used in packaging food, medical or cleaning products to hold low viscosity fluids (e.g., juice and soda), high viscosity fluids (e.g., condiments and sauces), fluid/solid mixtures (e.g., soups and vegetables in brine), gels, powders, and powder materials.

The benefit of such pouches lies, at least in part, in the fact that, they are easy to store prior to filling and produce very little waste when discarded. The pouches can be formed into a variety of sizes and shapes, and can be filled under cold or hot conditions. In some cases the pouches have to withstand drastic thermal and/or chemical and/or physical treatments, such as pasteurization or sterilization, in order to reduce or eliminate bacterial contamination.

Pouches can be pre-made or, alternatively, they can be formed just before being filled, for example according to Vertical Form Fill Seal (VFFS) packaging systems that have proven to be very useful in packaging a wide variety of flowable products. The VFFS process is known to those of skilled in the art, and described for example in U.S. Pat. No. 4,589,247.

A flowable product is introduced through a central, vertical fill tube to a formed tubular film having been sealed transversely at its lower end, and longitudinally. The pouch is then completed by sealing the upper end of the tubular segment, and severing the pouch from the tubular film above it.

The choice of packaging materials is very important, and should be matched to the intended end use of the pouch.

Said materials should ideally show dimensional and seal stability (no deformation, pleats or bubbles when filled-in with hot fluids), easy sealability, heat and abuse resistance, good optical properties, chemical stability (no release of substances into the package) and, for certain applications, gas barrier characteristics.

There are several multilayer structures known in the art that have been used for these specific applications such as for example the five layered films described in EP0946360, comprising a core polyamide layer, two intermediate tie layers, disposed on opposite surfaces of the core layer, and two outer layers, each disposed on a surface of the respective intermediate layer, comprising an ethylene/alpha olefin copolymer) or the seven layered films disclosed in WO02074537, in which the polyamide core layer additionally comprises a gas barrier layer substantially made of ethylvinylalcohol copolymer (EVOH).

These known structures however are not fully satisfactory, especially as far as mechanical and optical properties are concerned.

We have now surprisingly found that by inserting at least one, preferably two additional HDPE layers into standard fluid products packaging structures, new multilayer films which overcome the drawbacks mentioned above are provided. The films of the present invention show a very good balance of mechanical, chemical and, optionally, barrier properties, good sealability, heat resistance and unexpectedly improved optical properties.

DISCLOSURE OF INVENTION

A first object of the present invention is a co-extruded multilayer film for packaging fluid products comprising:
- a core layer (D) comprising a polyamide;
- two tie layers (C), directly adhered to the opposite surfaces of the core layer;
- at least one intermediate layer (B), directly adhered to the opposite surface of a tie layer (C), comprising high density polyethylene; and
- two outer layers (A) comprising an ethylene/alpha olefin copolymer.

A second object of the present invention is a process for manufacturing said film comprising the steps of a) co-extruding a tubular film according to the present invention through a round die and b) quenching said tubular film at a temperature from about 5 to about 40° C.

A third object of the present invention is a pre-made open pouch manufactured from said film.

A fourth object of the present invention is a package comprising a flowable product and a pouch containing the flowable product, the pouch being made from said film.

A fifth object of the present invention is the use of said film in VFFS applications.

DEFINITIONS

The term "core layer" as used herein refers to the central layer (D) of a multi-layer film.

As used herein, the phrase "inner layer" in connection with the multi-layer film refers to a layer having both its surfaces adhered to other layers of the film The term "intermediate" as used herein refers to a layer of a multi-layer film which is between an outer layer (A) and core layer (D) of the film.

As used herein the term "tie layer" (C) refers to any inner layer having the primary purpose of adhering two layers to one another.

As used herein the term "directly adhered" as applied to the layers of a multi-layer film, refers to the adhesion of a first element to a second element, without an adhesive, a tie layer or any other layer therebetween. In contrast, as used herein, the word "adhered", when used without the adverb "directly", broadly refers to the adhesion of a first element to a second element either with or without an adhesive, a tie layer or any other layer therebetween.

As used herein the term "barrier layer" refers to a gas barrier layer or, preferably, to an oxygen-barrier layer, and it is used to identify layers or structures characterized by an Oxygen Transmission Rate (evaluated at 23° C. and 0% R.H. according to ASTM D-3985) of less than 250 $cm^3$ $m^2 \cdot day \cdot atm$.

"Polymer" herein includes homopolymer, copolymer, terpolymer, etc.

"Copolymer" herein includes copolymer, terpolymer, etc.

As used herein the term "polyamide" refers to high molecular weight polymers having amide linkages along the molecular chain, and refers more specifically to synthetic polyamides such as nylons. Such term encompasses both homo-polyamides and co-(or ter-) polyamides. It also specifically includes aliphatic polyamides or co-polyamides, aromatic polyamides or co-polyamides, and partially aromatic polyamides or co-polyamides, modifications thereof and blends thereof. The homo-polyamides are derived from the polymerization of a single type of monomer comprising both the chemical functions which are typical of polyamides, i.e. amino and acid groups, such monomers being typically lactams or aminoacids, or from the polycondensation of two types of polyfunctional monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side.

"Tie" or "adhesive" refers to adhesives, preferably polymeric adhesives, more preferably polyolefins having an anhydride functionality grafted thereon and/or copolymerized therewith and/or blended herewith. "Anhydride functionality" refers to any form of anhydride functionality, such as the anhydride of maleic acid, fumaric acid, etc., whether grafted onto a polymer, copolymerized with a polymer, or blended with one or more polymers, and is also inclusive of derivatives of such functionalities, such as acids, esters, and metal salts derived therefrom.

As used herein, the phrase "ethylene/alpha-olefin copolymer" (EAO) refers to such heterogeneous materials as linear density polyethylene (LDPE), linear medium density polyethylene (LMDPE), linear low density polyethylene (LLDPE), and very low and ultra low density polyethylene (VLDPE and ULDPE); as well as homogeneous polymers (HEAO) such as Dowlex SC2107 ethylene/alpha olefin copolymers supplied by Dow Ziegler/Natta catalyzed. These materials generally include copolymers of ethylene with one or more comonomers selected from C4 to C10 alpha-olefins such as butene-I (i.e., I-butene), hexene-I, octane-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/alpha-olefin copolymers, such as the long chain branched homogeneous ethylene/alpha-olefin copolymers available from Total Petrolchemicals, known as 1008 FE24, are also included as another type of ethylene/alpha-olefin copolymer useful in the present invention.

"Low density polyethylene" (LDPE) as used herein has a density in the range of from about 0.916 to 0.924 grams per cubic centimeter.

"Linear low density polyethylene" (LLDPE) as used herein has a density in the range of from about 0.916 to 0.924 grams per cubic centimeter. "Linear medium density polyethylene" (LMDPE) as used herein, has a density from 0.930 grams per cubic centimeter to 0.939 grams per cubic centimeter.

"High density polyethylene" (HDPE), as defined herein, has a density of 0.94 grams per cubic centimeter or more and MFR from 8 to 0.4 gr/10 min.

"Flowable or fluid" products or materials herein means food or non-food items which are flowable under gravity or that can be pumped.

As used herein, the term "EVOH" includes saponified or hydrolyzed ethylene-vinyl acetate copolymers.

All percentages used herein, unless differently specified, are calculated on a "by weight" basis.

DETAILED DESCRIPTION OF THE INVENTION

A first object of the present invention is a co-extruded multilayer film for packaging fluid products comprising:

a core layer (D) comprising a polyamide;

two tie layers (C), directly adhered to the opposite surfaces of the core layer;

at least one intermediate layer (B), directly adhered to the opposite surface of a tie layer (C), comprising high density polyethylene; and two outer layers (A) comprising an ethylene/alpha olefin copolymer.

The core layer (D) of the present invention comprises a polyamide (PA).

Said polyamide can be the only component of the core layer (D) or, alternatively, it can be blended with other compatible polymers, preferably with other polyamides or with EVOH.

The core layer (D) of the present film comprises a single or, alternatively, a multilayered structure, said multilayer structure preferably comprising more than one polyamide layer.

In case of a core layer (D) comprising more than one polyamide layer, said polyamide layers can be directly adhered to each other or, alternatively, can be separated by at least one intermediate layer, preferably by at least one intermediate tie layer or barrier layer.

In case the core layer (D) comprises a single polyamide layer, at least one barrier layer can be optionally adhered.

Preferably the core layer (D) consists of a single polyamide layer or, alternatively, of a three layered structure wherein two layers of polyamide have an intermediate layer in between. Preferably the intermediate layer is a tie layer or a barrier layer, the core layer (D) thus consisting in the sequence PA/tie/PA or PA/barrier/PA. The three layer core sequences PA/tie/PA or PA/barrier/PA may be present once or may be multiplied more times within the core structure (D).

Preferably the barrier layer comprises EVOH, the core layer (D) thus comprising the sequence PA/EVOH/PA. The three layer core sequence PA/EVOH/PA may be present once or may be multiplied more times within the core structure (D).

Preferred polyamides include nylon 6, nylon 11, nylon 12, nylon 66, nylon 69, nylon 610, nylon 612, nylon 6/66, amorphous nylon and admixtures thereof, more preferred polyamide is nylon 6.

The barrier layer comprises EVOH, preferably vinyl alcohol copolymers having an ethylene comonomer content comprised from about 30 to about 50 mole %, more preferably, from about 36 to about 48 mole % ethylene, and even more preferably, from about 38 to about 46 mole % ethylene, and a saponification degree of at least 85%, preferably at least 90%, optionally blended with polyamides as those described for example in WO2006101969. Preferably EVOH is used as the only component of the barrier layer.

The thickness of the EVOH gas-barrier layer will be set in order to provide the overall multi-layer film with the optimal Oxygen Transmission Rate (OTR), lower than 250 cm$^3$/m$^2$·day·atm, preferably lower than 100, more preferably lower than 50, even more preferably lower than 5, when measured at 23° C. and 0% of relative humidity (evaluated by following the method described in ASTM D3985).

Typically when EVOH is employed as the only gas-barrier material, this is achieved with a thickness between 6 and 22, preferably between 8 and 20, more preferably between 10 and 18 microns. Thicker layers can be used if desired or if a lower OTR is needed. In case of multiplied structures the thickness of each layer of EVOH may be much lower, depending also on the number of duplications.

The present film comprises two tie layers (C) directly adhered to the opposite surfaces of the core layer (D). Useful polymers for tie layers include ethylene-unsaturated acid copolymers, ethylene-unsaturated ester copolymers, anhydride-modified polyolefins, polyurethane, and mixtures thereof. Preferred polymers for tie layers include one or more of thermoplastic polymers such as ethylene-vinyl acetate copolymers with high vinyl acetate content (e.g. 18-28 wt. % or even more), ethylene-(meth)acrylic acid copolymers, ethylene homo-polymers or co-polymers, such as LDPE, LLDPE or EVA, modified with anhydride or carboxylic acid functionalities, blends of these resins or blends of any of the above resins with an ethylene homo- or co-polymer, and the like known resins.

Tie layers are of a sufficient thickness to provide the adherence function, as known in the art. Each tie layer may be of a substantially similar or of a different composition and/or thickness. Additional tie layers can be optionally be present without departing from the scope of the present invention.

The film of the present invention comprises at least one intermediate layer (B), directly adhered to the opposite surface of a tie layer (C), said intermediate layer (B) comprising high density polyethylene. Preferably the film of the present invention comprises two intermediate layers (B), directly adhered to the opposite surfaces of the tie layers (C).

Preferably said HDPE is characterized by a density from about 0.94 to 0.98, more preferably from 0.94 to 0.97, even more preferably from 0.94 to 0.96 g/cm$^3$ and/or by a MFR from about 8 to 0.4, more preferably from 4 to 0.4, even more preferably from 2 to 0.4 g/10 min.

The film of the present inventions comprises two outer layers (A), adhered on to at least one intermediate layer (B) and on to a tie layer (C) respectively; in case of preferred structures comprising two intermediate layers (B), each outer layer (A) is adhered on a surface of the corresponding intermediate layer (B), said outer layers (A) comprising an ethylene/alpha olefin copolymer.

Suitable ethylene/alpha-olefin copolymers are for example those described in EP0946360, in WO2006102148 or in WO2006102156, preferably comprising admixtures of LLDPE and LDPE, more preferably admixtures from about 60 to 80% of LLDPE and from about 20 to 40% of LDPE. The outer layers (A) preferably have the same composition, being thus particularly suitable for manufacturing lap sealed pouches.

One or more of any of the layers of the multilayer film of the present invention may include appropriate amounts of additives typically included in structures for medical or, preferably, for food packaging for the desired effect, as is know to those of skill in the art of packaging films. For example, a layer may include additives such as slip agents (e.g., as talc), antiblock agents, antioxidants, fillers, dyes and pigments, cross-linking enhancers, cross-linking inhibitors, radiation stabilizers, oxygen scavengers, antistatic agents, and the like agents.

The multi-layer film of the present invention may be transparent or opaque, preferably transparent, and can be optionally colored, by addition of suitable pigments generally known in the art.

The multi-layer film of the present invention may have any total thickness, so long as the film provides the desired properties for the particular packaging application. For use as fluid packaging applications the film of the present invention has preferably a total thickness of from about 50 to about 200 microns, preferably from about 75 to about 180, more preferably from about 70 to about 160.

A preferred film according to the present invention is a co-extruded multilayer film for fluid packaging comprising:
 a core layer (D) comprising a polyamide;
 two tie layers (C), directly adhered to the opposite surfaces of the core layer;
 two intermediate layers (B), directly adhered to the opposite surfaces of the respective tie layer (C), comprising a high density polyethylene; and
 two outer layers (A), each adhered on a surface of the respective intermediate layer (B), comprising an ethylene/alpha olefin copolymer.

A more preferred film according to the present invention is a co-extruded multilayer film for fluid packaging comprising:
 a core layer (D) comprising a polyamide;
 two tie layers (C), directly adhered to the opposite surfaces of the core layer;
 two intermediate layers (B), directly adhered to the opposite surfaces of the respective tie layer (C), consisting of a high density polyethylene; and two outer layers (A), each directly adhered on a surface of the respective intermediate layer (B), comprising an ethylene/alpha olefin copolymer.

The multilayer film of the present invention is at least a 6 layered film having the structure A/C/D/C/B/A, preferably a 7 layered film having the structure A/B/C/D/C/B/A.

In case the core layer (D) is a multilayer structure, the total number of effective layers increases accordingly.

Preferred structures are symmetrical structures, more preferred structures are those in which the layers represented by the same letter have the same composition.

Additional tie or intermediate layers may also be present within the structure of the film of the present invention.

The multilayer film of the present invention has preferably the following composition expressed as percentage by weight with respect to the overall film weight: outer layers (A) from about 5 to 40%, more preferably from about 10 to 35%, even more preferably from about 25 to 35%; polyamide layer(s) within the core layer (D) from about 5 to 30%, more preferably from about 10 to 28%, even more preferably from 15 to 25%; optional EVOH layer within the core layer (D) from 0 to 25%, more preferably from 0 to 20%, even more preferably from 0 to 15%; intermediate layer(s) (B) HDPE from about 10 to 60%, more preferably from 15 to 50%, even more preferably from 20 to 40%; tie layers from about 5 to 40%, more preferably from about 10 to 30%, even more preferably from 10 to 20%.

The film of the present invention is characterized by particularly good optical properties.

Accordingly, an object of the present invention is a co-extruded multilayer film for packaging fluid products comprising:
 a core layer (D) comprising a polyamide;
 two tie layers (C), directly adhered to the opposite surfaces of the core layer;
 at least one intermediate layer (B), directly adhered to the opposite surface of a tie layer (C), comprising high density polyethylene; and
 two outer layers (A) comprising an ethylene/alpha olefin copolymer,
 characterized by an haze measured according to ASTM D1003 not higher than 20%, preferably not higher than 15% and/or a gloss measured according to ASTM D4257 higher than 90, preferably higher than 100, more preferably higher than 105 and/or a clarity measured according to ASTM D1003 higher than 85%, preferably higher than 90%.

The film of the present invention shows other good properties, comparable or improved with respect to standard structures for packaging fluid products, such as a wider sealing window, better hot dimensional and seal stability, better mechanical performance (modulus and drop test), good machinability and, finally, food law compliance, being suitable for packaging and storage of all kind of food at room temperature or below, for heat treatment of all type of food up to 121° C. for 1 h and also for microwaving.

A second object of the present invention is a process for manufacturing a film according to the first object of present invention comprising the steps of:

a) co-extruding a film comprising a core layer (D) comprising a polyamide; two tie layers (C), directly adhered to the opposite surfaces of the core layer; at least one intermediate layer (B), directly adhered to the opposite surface of a tie layer (C), comprising high density polyethylene; and two outer layers (A) comprising an ethylene/alpha olefin copolymer, and b) quenching said tubular film at temperature from 5 to 40° C.

The films according to the present invention are made by co-extrusion, preferably by round co-extrusion through a round die.

After co-extrusion, the co-extruded film, preferably the co-extruded tubular film, is generally quenched at a temperature from 5 to 40° C., preferably from 10 to 30° C., more preferably from 20 to 25° C. Quenching is generally performed according to methods known in the art, preferably with water and/or air.

After quenching the film of the present invention, if in tubular form, is slit and finally forwarded to the winding station(s). Optionally, the film of the present invention can be further treated according to processes well known in the art such as, for example, corona treatment, printing, etc.

The multilayer films of the invention, or only one or more of, preferably all, the thermoplastic layers thereof, are optionally cross-linked.

Cross-linking is aimed at improving the strength of the film and/or helping to avoid burn through during heat seal operations and at increasing the heat resistance of the film.

The preferred method of cross-linking is by electron-beam irradiation and is well known in the art. One skilled in the art can readily determine the radiation exposure level suitable for a particular application. Generally, however, radiation dosages of up to about 250 kGy are applied, typically between about 80 and about 240 kGy, with a preferred dosage of between 90 and 220 kGy, and a most preferred one between 110 and 200 kGy.

Irradiation is carried out conveniently at room temperature, although higher and lower temperatures, for example, from 0 to 60° C. may be employed.

A third object of the present invention is a pre-made open pouch, namely a pouch generally manufactured by folding a pre-cut film or by coupling at least two pre-cut films according to the present invention, by subsequently sealing said folded film on two sides or said coupled films on three sides, thus leaving a side of the pre-made pouch open and ready to be filled in with the fluid product and, finally, to be closed by a last seal.

Both pre-made and in-line made pouches, can be sealed according to fin seal or lap seal mode; preferably pouches made in line according to VFFS process have transversal fin seals and at least one longitudinal lap seal, but other sealing modes (i.e. two longitudinal and two transversal seals) are also within the scope of the present invention. The pouches object of the present invention may differ in size, namely they can contain, for example, from 0.05 to 20 l of a flowable product, but other different sizes can also be manufactured.

A fourth object of the present invention is a package comprising a flowable product and a pouch containing the flowable product, the pouch being made from a film according to the present invention. The flowable product can be any flowable product suitable for fluid packaging applications, such as food and non-food, medical, pharmaceutical, diagnostic, personal care, cosmetics and the like applications.

A fifth object of the present invention is the use of the film of the present invention in VFFS (Vertical Form Fill Seal) applications.

EXAMPLES

The following examples are presented for the purpose of further illustrating the present invention and are not to be taken as limiting in any regard. Unless otherwise indicated, all parts and percentages are by weight.

The following abbreviations are used:

PA, PAs=polyamide, polyamides d=density (g/cm$^3$)

MFR=melt flow rate (g/10 min)

mp=melting point (° C.)

EVOH=ethylene vinyl alcohol

HDPE=High-Density Polyethylene

LDPE=Low-Density Polyethylene

LLDPE=Linear Low-Density Polyethylene

FFU=fit for use

NFFU=not fit for use n.a.=not available

Example 1

High Barrier

A multilayer film (9 layers overall) having the following symmetrical structure A/B/C/D/C/B/A, in which:

A is a blend of 68% LLDPE sold by Dow (Dowlex SC2107 Polyethylene, Linear Low Density Ethylene/Octene Copolymer Linear, Ziegler/Natta, d=0.917 MFR=2.3 mp=124° C.), 26% LDPE sold by Total Petrochemicals (1008FE24 Polyethylene Low Density Homopolymer, d=0.924), 4% Free Radical Masterbatch AntiBlock sold by Schulman (Polybatch AB-5 Silica in Polyethylene, Low Density Amorphous Silica, d=0.96 MFR=17) and 2% Masterbatch AntiBlock and Slip sold by Schulman (Polybatch FSU 105E AntiBlock and Slip in Polyethylene, Low Density 10% ash+10% SiO2, d=0.98 MFR=20);

B is HDPE sold by Sabic (HDPE F04660, d=0.961 MFR=0.8);

C is a tie sold by Rohm & Haas (Tymor 1228B Maleic Anhydride-Modified Polyethylene, Linear Low Density, d=0.921 MFR=2 mp=123° C.);

D is a three layers structure PA/EVOH/PA in which PA is a Polyamide-6 sold by BASF (Ultramid B36LN Lubricated and Nucleated Poly(caprolactam), MFR=24, mp=220° C.) and EVOH is an Ethylene/Vinyl Alcohol Copolymer sold by Nippon Gohsei (Soarnol ET3803 Hydrolyzed Ethylene/Vinyl Acetate Copolymer Between 30-40 mole % Ethylene, d=1.17 MFR=3.2 mp=173° C.); was manufactured by co-extrusion of the multilayer film on a round die, followed by quenching with water and air ring quenching system, finally by off line slitting of the tubular film. The resulting multilayer film had an average overall thickness of 140 microns and average partial thicknesses of 20 (A), 18 (B), 11 (C), 42 (D) (14+14+14), 11 (C), 18 (B), 20 (A) microns.

The films described in the following examples were substantially manufactured under the same conditions of Example 1, unless otherwise specified.

Example 2

High Barrier, Cross-Linked

A multilayer film was manufactured as described in Example 1. After quenching the film was cross-linked at 200 Grays and then slit.

Example 3

High Barrier, Different Tie

A multilayer film was manufactured as described in Example 1, the only difference being the tie used for layers C, tie sold by Lyondell Basell Industries (Plexar PX3236 Maleic Anhydride-Modified Polyethylene, Linear Low Density, d=0.921 MFR=2 mp=125° C.)

Example 4

Low Barrier, Colored

A multilayer film (7 layers overall) having the following symmetrical structure A/B/C/D/C/B/A, in which layers A, B and C were the same of Example 1, with the addition in one of the B layers of 8% of Concentrate, Blue sold by Clariant (Sarmatene Skye Blue T 42626, Blue in Polyethylene, Low Density d=0.925), layer D consists of a single layer of Polyamide-6 sold by BASF (Ultramid B36LN Lubricated and Nucleated Poly(caprolactam), MFR=24, mp=220° C.), was manufactured according to the process of Example 1.

The resulting multilayer film had an average overall thickness of 125 microns and average partial thicknesses of 22 (A), 17 (B), 11 (C), 25 (D), 11(C), 17 (B), 22 (A) microns.

Example 5 (Comparative)

No B Layers, High Barrier

A multilayer film (7 layers overall) having the following symmetrical structure A/C/D/C/A, in which A is a blend of 68% LLDPE sold by Dow (Dowlex SC2107 Polyethylene, Linear Low Density Ethylene/Octene Copolymer, Ziegler/Natta, d=0.92 MFR=21 mp=124° C.), 25% LDPE sold by Westlake Chemical (EB 403AQ, Polyethylene Low Density Homopolymer, d=0.924 MFR=0.8), 5% MB AntiBlock and Slip sold by Ampacet (10850, AntiBlock and Slip in Polyethylene, Linear Low Density, d=0.95 MFR=1.8) and 2% MB Processing Aid sold by Ampacet (100458, Fluoropolymer in Polyethylene, Linear Low Density, AntiBlock 3%, d=0.93, MFR=2.3)

C is a tie sold by Lyondell Basell Industries (Plexar PX3236 Maleic Anhydride-Modified Polyethylene, Linear Low Density, d=0.921 MFR=2 mp=125° C.)

D is a three layers structure PA/EVOH/PA in which PA is a Polyamide-6 sold by BASF (Ultramid B33LN01 Lubricated and Nucleated Poly(caprolactam), d=1.14 mp=220° C.) and EVOH is an Ethylene/Vinyl Alcohol Copolymer sold by Nippon Gohsei (Soarnol ET3803 Hydrolyzed Ethylene/Vinyl Acetate Copolymer Between 30-40 mole % Ethylene, d=1.17 MFR=3.2 mp=173° C.), was manufactured according to the process of Example 1.

The resulting multilayer film had an average overall thickness of 140 microns and average partial thicknesses of 35 (A), 14 (C), 42 (D) (14+14+14), 14 (C), 35 (A) microns.

Example 6 (Comparative)

No B Layers, Low Barrier, Colored

A multilayer film (5 layers overall) having the following symmetrical structure A/C/D/C/A, in which A is a blend of 70% LLDPE sold by Dow (Dowlex SC2107 Polyethylene, Linear Low Density Ethylene/Octene Copolymer Linear, Ziegler/Natta, d=0.917 MFR=2.3 mp=124° C.), 28.5% LDPE sold by Total Petrochemicals (1008FE24 Polyethylene Low Density Homopolymer, d=0.924), 1% Free Radical Masterbatch AntiBlock sold by Schulman (Polybatch AB-5 Silica in Polyethylene, Low Density Amorphous Silica, d=0.96 MFR=17), 0.5% Masterbatch AntiBlock and Slip sold by Schulman (Polybatch FSU 105E AntiBlock and Slip in Polyethylene, Low Density 10% ash+10% SiO2, d=0.98 MFR=20) and, in one of A layers, 8% of Concentrate, Blue sold by Clariant (Sarmatene Skye Blue T 42626, Blue in Polyethylene, Low Density d=0.925);

C is the same tie as in Example 1,

D consists of a single layer of Polyamide-6 (Nylon) sold by EMS-Grivory (Grilon F 40 NL Natural 6018, Lubricated and Nucleated Poly(caprolactam) d=1.14), was manufactured according to the process of Example 1.

The resulting multilayer film had an average overall thickness of 125 microns and average partial thicknesses of 42 (A), 8 (C), 25 (D), 8 (C), 42 (A) microns.

The films of the Examples 1 to 6 were tested for evaluating their mechanical, optical and barrier properties according to the following test methods:

Modulus of elasticity (Kg/cm$^2$), tensile strength (Kg/cm$^2$) and elongation at break—(longitudinal/transversal (L/T) %)—were measured according to ASTM D882

Puncture resistance (g): was measured substantially according to ASTM D3763, in which a punching sphere having a 5 mm diameter, soldered on a plunger was used instead of the standard 3.2 mm diameter hemispherical probe.

Haze and clarity (%) were measured according to ASTM D1003.

Gloss (G.U. Gloss Units) was measured according to ASTM D2457.

Oxygen permeability (oxygen transmission rate, cm$^3$/m$^2$·day·atm) was measured according to ASTM D3985, under 0% and 100% RH (relative humidity).

The results of the tests described above are reported in the following table 1:

TABLE 1

| Ex | Modulus L/T | Tens streng L/T | Elong. at break L/T | Punct. Resist. | Haze | Gloss | Clar | OTR 0% RH | OTR 100% RH |
|---|---|---|---|---|---|---|---|---|---|
| 1 | 6500/ 6130 | 379/ 362 | 670/ 640 | 3670 | 15 | 106 | 91 | 1.5 | 37 |
| 2 | 9030/ 8730 | 362/ 358 | 600/ 570 | 3370 | 11.5 | 110 | 92 | 1.5 | 37 |
| 3 | 6680/ 6140 | 413/ 380 | 680/ 630 | 3300 | 11 | 110 | 91 | 1.7 | 40 |
| 4 | 5300/ 6680 | 353/ 325 | 690/ 620 | n.a. | 7 | 113 | 93 | 38 | 163 |
| 5 | 4923/ 5626 | 411/ 470 | 670/ 690 | 3600 | 34 | 77 | 86 | 0.75 | 19 |

TABLE 1-continued

| Ex | Modulus L/T | Tens streng L/T | Elong. at break L/T | Punct. Resist. | Haze | Gloss | Clar | OTR 0% RH | OTR 100% RH |
|---|---|---|---|---|---|---|---|---|---|
| 6 | 4100/ 4400 | 350/ 322 | 720/ 680 | 2500 | 22 | 78 | 94 | 28 | 110 |

As can be seen from table 1, all the films of the invention (Ex. 1-4) disclosed significantly improved optical properties (haze and/or gloss and/or clarity) with respect to the prior art films (Ex. 5 and 6), together with comparable or better mechanical performance. In particular the film of Ex. 2 had a value of modulus surprisingly high even for a cross-linked structure. The gas barrier properties of the films of the invention were substantially comparable with those of the prior art films.

The films of the present invention were also compliant with the European directive 82/711/EEC and following amendments relating to "Determination of the overall migration: verification of the suitability of articles and materials to be employed in contact with foodstuff". Accordingly they are suitable for packaging and storage of all kind of food at room temperature or below, for heat treatment of all type of food up to 121° C. for 1 h, and also for microwave applications.

The films of the Examples 1 to 6 were then converted into pouches through a classical VFFS process, namely said films were fed to the VFFS machine (Cryovac VPP2070C) which initially formed a tube from the flat film. Two vertical fin seals and then a bottom end seal were then applied to the tube. The flowable product was introduced into the closed tube, the second end seal was applied and finally the package cut from the tube. Both end seals consisted of fusion seals running parallel to each other, also known as multi-ribbed seals. The resulting pouches were tested for evaluating their functional properties according to the following test methods:

Hotfilltest:
the aim of this test was to verify the film stretching and the end seal resistance when the pouch was hot filled. The lower the stretch the better was the pack appearance and the weight control.

The boiling kettle, that feeds the VFFS machine (Cryovac VPP2070C, 510 mm tooling), was filled with a mixture of ketchup/oil/vinegar (1:1:1), so to simulate a demanding viscous food product. The mixture was heated up to 96° C., considering a filling temperature at machine level of about 90-91° C. About 50 pouches (3 kg each) were produced for each working condition, testing different end seal settings (temperature range from 135 to 190° C. at the sealing bars vs time of sealing varying from 0.8 to 1.0 sec). It was considered fit-for-use (FFU) a pouch that after hot filling did not present any pleat or present light pleats but without leaks. A pouch was not considered fit-for-use (NFFU) in the presence of heavy pleats and/or leaks.

Droptest:
this test evaluates the resistance of pouches when dropped on the floor, thus providing an indication both of the mechanical resistance as well as the ability to withstand the stress of internal handling, crating, palletization and transportation.

100 pouches for each film, containing water at room temperature (3 Kg) were manufactured on a Cryovac VPP 2002C machine (510 mm tooling), adjusting seal temperatures and times in order to provide hermetic packages. Each pouch was held flat, with the longitudinal seal up, at 2.5 m from the floor and then, let fall to the ground. Results were expressed in term of percentage of rejects (number of broken pouches).

Re-Heating Resistance (Pasteurization Resistance)

The aim of the test is to verify the resistance of the pouch body as well as of the seals to prolonged heating (hot boiling water, 60 minutes), as requested by some specific applications, such as food products that will require a prolonged heating to complete the cooking and/or to be served hot in the plate.

The pouches (20 pouches, 2 kg each, for each film's formulation to be tested as well as for the reference films) filled with water at room temperature, were manufactured on a Cryovac PP 2002C machine (420 mm tooling) with a nominal length of 380 mm. Seal temperatures and times were adjusted in order to provide hermetic packages as well as the pump feeding speed was set at the suitable values, generally known by the skilled in the art. The pouches were dipped into a boiling water kettle for 60 minutes, then removed, positioned on a flat surface with the longitudinal seal side up and, finally, inspected for leaks under gentle hand pressure. If any leak occurred, the pouch was considered as a reject. A new film's formulation was considered FFU when it resulted in no rejects.

The results of the test methods described above are reported in the following table 2:

TABLE 2

| Ex | Film thickn. microns | Hot fill test 150-135° C. 0.8 s | Hot fill test 150-135° C. 1.0 s | Hot fill test 160-145° C. 0.8 s | Hot fill test 160-145° C. 1.0 s | Hot fill test 170-155° C. 0.8 s | Hot fill test 170-155° C. 1.0 s | Drop total rejects | Re-heat. resist |
|---|---|---|---|---|---|---|---|---|---|
| 1 | 140 | FFU | FFU | FFU | FFU | FFU | FFU | 64% | FFU |
| 3 | 140 | FFU | FFU | FFU | FFU | FFU pleats | FFU pleats | 45% | FFU |
| 4 | 125 | FFU | FFU | FFU pleats | FFU pleats | FFU pleats | FFU pleats | n.a. | n.a. |
| 5 | 140 | FFU | FFU | FFU | FFU | FFU pleats | FFU pleats | 61% | FFU |
| 6 | 125 | FFU | FFU | FFU pleats | FFU pleats | NFFU | NFFU | 30% | n.a. |

The films of the present invention showed a comparable or better behaviour with respect to the films of prior art. In particular the film of Ex. 4 was suitable for hot fill (FFU) in the whole range of test conditions while the reference material of Ex. 6 showed severe pleats and leaks under the harshest conditions. Similarly film of Ex. 1 disclosed an improved hot fill resistance with respect to the comparative film of Ex. 5. Film of Ex. 3 showed similar hot fill resistance but much better drop test behavior with respect to the standard film of Ex. 5. Finally films of Ex. 1 and 3 resulted FFU (no rejects) in the re-heating resistance test, namely they are suitable for pasteurization applications.

Endsealwindow

This test evaluates the sealing performance of the films; it consists in a manual tearing of the seal in 25 mm specimens obtained by cutting empty pouches, manufactured with films of the present invention or prior art films on a VFFS machine, in which the sealing was performed under different conditions (temperature from 140 to 200° C. and time from 0.6 to 2.2 s).

The results of this test are disclosed in the following Tables 3a-3f:

TABLE 3a

| End seal temp | End seal time (s) | | | | | | | | |
|---|---|---|---|---|---|---|---|---|---|
| ° C. Ex. 1 | 0.6 | 0.8 | 1.0 | 1.2 | 1.4 | 1.6 | 1.8 | 2.0 | 2.2 |
| 140/125 | − | − | − | − | − | − | −/+ | + | + |
| 150/135 | − | − | − | − | + | + | + | + | + |
| 160/145 | − | −/+ | + | + | + | + | + | + | + |
| 170/155 | − | + | + | Best | + | + | + | + | + |
| 180/165 | − | + | + | + | + | + | + | + | + |
| 190/175 | −/+ | + | + | + | + | + | + | + | −/+ |
| 200/185 | + | + | + | + | + | + | + | −/+ | − |

TABLE 3b

| End seal temp | End seal time (s) | | | | | | | | |
|---|---|---|---|---|---|---|---|---|---|
| ° C. Ex. 2 | 0.6 | 0.8 | 1.0 | 1.2 | 1.4 | 1.6 | 1.8 | 2.0 | 2.2 |
| 140/125 | − | − | − | − | − | − | −/+ | + | + |
| 150/135 | − | − | − | − | + | + | + | + | + |
| 160/145 | − | −/+ | + | + | + | + | + | + | + |
| 170/155 | − | + | + | Best | + | + | + | + | + |
| 180/165 | − | + | + | + | + | + | + | + | + |
| 190/175 | −/+ | + | + | + | + | + | + | + | −/+ |
| 200/185 | + | + | + | + | + | + | + | −/+ | − |

TABLE 3c

| End seal temp | End seal time (s) | | | | | | | | |
|---|---|---|---|---|---|---|---|---|---|
| ° C. Ex. 3 | 0.6 | 0.8 | 1.0 | 1.2 | 1.4 | 1.6 | 1.8 | 2.0 | 2.2 |
| 140/125 | − | − | − | − | − | − | −/+ | + | + |
| 150/135 | − | − | − | − | + | + | + | + | + |
| 160/145 | − | −/+ | + | + | + | + | + | + | + |
| 170/155 | − | + | + | Best | + | + | + | + | + |
| 180/165 | − | + | + | + | + | + | + | + | + |
| 190/175 | −/+ | + | + | + | + | + | + | + | −/+ |
| 200/185 | + | + | + | + | + | + | + | −/+ | − |

TABLE 3d

| End seal temp | End seal time (s) | | | | | | | | |
|---|---|---|---|---|---|---|---|---|---|
| ° C. Ex. 4 | 0.6 | 0.8 | 1.0 | 1.2 | 1.4 | 1.6 | 1.8 | 2.0 | 2.2 |
| 140/125 | − | −/+ | −/+ | + | + | + | + | + | + |
| 150/135 | + | + | + | + | + | + | + | + | + |
| 160/145 | + | + | + | + | + | + | + | + | + |
| 170/155 | + | + | + | Best | + | + | + | + | + |
| 180/165 | + | + | + | + | + | + | + | + | + |
| 190/175 | + | + | + | + | + | + | −/+ | − | − |
| Ex. 4) | + | + | + | + | + | −/+ | − | − | − |

TABLE 3e

| End seal temp | End seal time (s) | | | | | | | | |
|---|---|---|---|---|---|---|---|---|---|
| ° C. Ex. 5 | 0.6 | 0.8 | 1.0 | 1.2 | 1.4 | 1.6 | 1.8 | 2.0 | 2.2 |
| 140/125 | − | − | − | − | − | − | − | + | + |
| 150/135 | − | − | − | − | −/+ | + | + | + | + |
| 160/145 | − | − | − | −/+ | + | + | + | + | + |
| 170/155 | − | −/+ | + | Best | + | + | + | + | + |
| 180/165 | − | + | + | + | + | + | + | + | + |
| 190/175 | −/+ | + | + | + | + | + | + | + | −/+ |
| 200/185 | + | + | + | + | + | + | + | −/+ | − |

TABLE 3f

| End seal temp | End seal time (s) | | | | | | | | |
|---|---|---|---|---|---|---|---|---|---|
| ° C. Ex. 6 | 0.6 | 0.8 | 1.0 | 1.2 | 1.4 | 1.6 | 1.8 | 2.0 | 2.2 |
| 140/125 | − | − | − | − | − | −/+ | + | + | + |
| 150/135 | − | − | − | − | −/+ | + | + | + | + |
| 160/145 | − | − | − | −/+ | + | + | + | + | + |
| 170/155 | −/+ | + | + | + | Best | + | + | + | + |
| 180/165 | + | + | + | + | + | + | + | + | + |
| 190/175 | + | + | + | + | + | + | + | + | −/+ |
| 200/185 | + | + | + | + | + | + | + | −/+ | − |

Key:
+ withstand manual tearing;
+/− difficult tearing;
− easy tearing.

The results of the end seal window test disclosed in the above Tables 3a-3f demonstrate that the films of the present invention (Ex. 1-4) showed good sealability properties and generally comparable or wider sealing temperature/time ranges with respect to the standard films (Ex. 5-6).

The invention claimed is:

1. A co-extruded multilayer film for packaging fluid products comprising:
   a) a core layer (D) comprising a polyamide;
   b) two tie layers (C), directly adhered to the opposite surfaces of the core layer;
   c) two intermediate layers (B), directly adhered to the opposite surfaces of the tie layers (C), comprising high density polyethylene; and
   d) two outer layers (A) comprising an ethylene/alpha olefin copolymer.

2. The film of claim 1, wherein the film is characterized by at least one of
   a) a haze measured according to ASTM D1003 not higher than 20%,
   b) a gloss measured according to ASTM D4257 higher than 90, and
   c) a clarity measured according to ASTM D1003 higher than 85%.

3. The film of claim 1 wherein the core layer (D) consists of
   a) a single polyamide layer, or
   b) three layer sequence consisting of polyamide/barrier/polyamide.

4. The film of claim 1 in which said polyamide is selected from the group consisting of nylon 6, nylon 11, nylon 12, nylon 66, nylon 69, nylon 610, nylon 612, nylon 6/66, amorphous nylon and mixtures thereof.

5. The film of claim 1, wherein said high density polyethylene is characterized by at least one of
   a) a density from about 0.94 to 0.98 g/cm$^3$, and
   b) a MFR from about 8 to 0.4 g/10 min.

6. The film of claim 1 in which the outer layers (A) comprise admixtures of linear low density polyethylene and low density polyethylene.

7. The film of claim 1 characterized by the following composition:
   a) outer layers (A) comprising a total of from 5% to 40% by weight of the overall film weight;
   b) polyamide within the core layer (D) comprising a total of from 5 to 30% by weight of the overall film weight;
   c) high density polyethylene within the two intermediate layers (B) comprising a total of from 10 to 60% by weight of the overall film weight; and
   d) tie layers comprising a total of from 5 to 40% by weight of the overall film weight.

8. The film of claim 1 in which one or more of the layers is cross-linked.

9. A pre-made open pouch made from the film of claim 1.

10. A package comprising a flowable product and a pouch containing the flowable product, the pouch being made from the film of claim 1.

11. A process for manufacturing a film comprising the steps of:
   a) co-extruding a tubular film comprising a core layer (D) comprising a polyamide, two tie layers (C), directly adhered to the opposite surfaces of the core layer, two intermediate layers (B), directly adhered to the opposite surfaces of the tie layer (C), comprising high density polyethylene, and two outer layers (A) comprising an ethylene/alpha olefin copolymer, through a round die; and
   b) quenching said tubular film at a temperature from 5 to 40° C.

12. The process of claim 11 in which said quenching is performed at a temperature from 10 to 30° C.

13. The process of claim 11 further comprising a cross-linking step.

* * * * *